United States Patent [19]
Lotz et al.

[11] Patent Number: 5,308,042
[45] Date of Patent: May 3, 1994

[54] OXY-CUTTING MACHINE WITH MASS FLOW CONTROLLED SUPPLY TO THE CUTTING BURNER

[75] Inventors: Horst K. Lotz, Hofheim-Wallau, Fed. Rep. of Germany; Glyndwr Manning, Burton Upon Trent, Great Britain; Mattias Lotz, Wiesbaden-Delkenheim, Fed. Rep. of Germany

[73] Assignee: GeGa Corporation, Carnegie, Pa.

[21] Appl. No.: 818,625

[22] Filed: Jan. 10, 1992

[51] Int. Cl.⁵ .................................. B23K 7/00
[52] U.S. Cl. .............................. 266/74; 266/48
[58] Field of Search ............... 266/48, 74; 148/194

[56] References Cited

U.S. PATENT DOCUMENTS 2,416,161  2/1947  Deck .................................. 148/194
4,439,249  3/1984  Singh et al. ........................ 266/76

FOREIGN PATENT DOCUMENTS 879045250  12/1985  European Pat. Off.
WO8800317  1/1988  PCT Int'l Appl.

*Primary Examiner*—Scott Kastler
*Attorney, Agent, or Firm*—Walter J. Blenko, Jr.; George K. Stacey

[57] ABSTRACT

Use of a mass flow cock with control units and pressure reducing systems results in an even output at changing exit dimensions respectively nozzle exit bores by an automatic balancing of the process volumes, reduces thereby the equipment expenditure and increases the maintenance intervals. This mass flow cock operates using a large pressure difference and an exact adjustment of a special cock piece at two diaphragms.

7 Claims, 1 Drawing Sheet

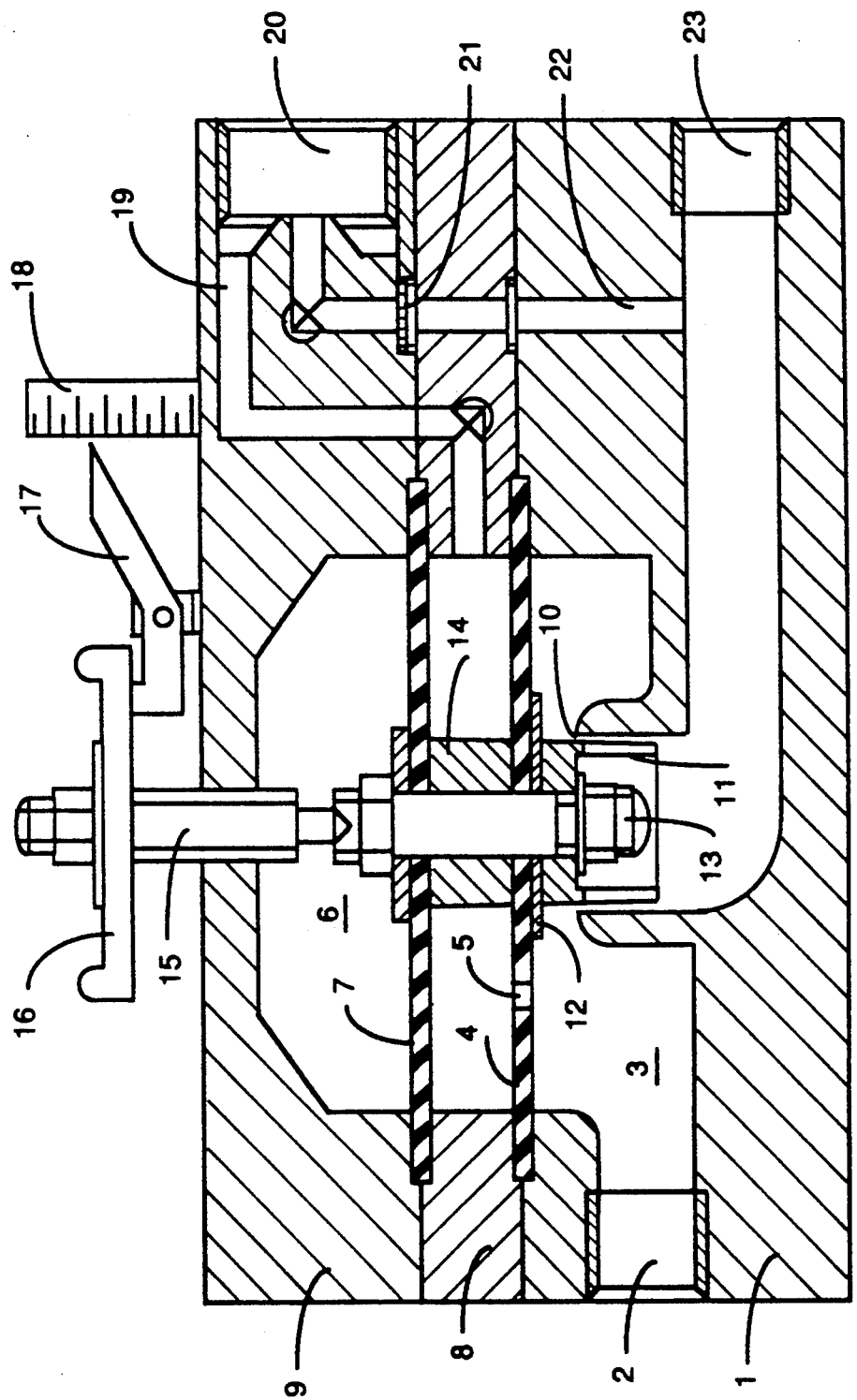

OXY-CUTTING MACHINE WITH MASS FLOW CONTROLLED SUPPLY TO THE CUTTING BURNER

BACKGROUND OF THE INVENTION

During oxy-cutting, scarfing, heating and similar procedures using a heating gas flame in which a mixture of oxygen or air is burnt with a fuel gas, there can be a reduction of passages and therefore a reduction of gas quantities resulting in a weaker than required heating flame power due to pollution of the nozzles or safety-, measuring-or other gas supplying arts arranged before it. Vice versa it is possible that an increase of the passage and outlet diameters due to abrasion leads to an increase of throughout and respectively heating capacity. Therefore a frequent adjustment of the heating flame media especially near the nozzle is necessary to achieve a safe and effective performance. On one hand access is very limited due to environmental or constructional circumstances i.e. during oxy-cutting of hot steel products and because of the very long operation times which cannot be interrupted, on the other hand a frequent adjustment of pressure reducers and valves is work requiring and susceptible for mistakes.

There are methods and procedures by which the requested operation circumstances of the gas operated and heating flame producing equipment are regulated or adapted automatically, depending on problem and duty, especially when the number of heating flame nozzles can be changed during production. The electronical measurement of data and their processing in computers or similar for regulating intervention by adjusting, switch on or off of control devices is typical for these methods, as described i.e. in the U.S. Pat. No. 4,439,249 and EP 0188 763. The necessary effort for that is very extensive, very expensive and increases the susceptibility to disruptions of the plant.

SUMMARY OF THE INVENTION

In this opposite the invention described allows a simple, although limited automation on the supply control for efficient heating flames or similar media exit circumstances at nozzles with low cost extension of available devices by using real, practice related circumstances and knowledge won in tests.

1. Because in many cases a media supply system i.e. for oxy-cutting or scarfing was adjusted economically by hand to achieve a more or less good heating flame certain deviations from the optimum adjustment have been accepted depending on experience and training of the operators.

A reduction of the adjustment procedures favors an adjustment by qualified personnel with better results as a starting base.

2. The total range of adjustment until cleaning or exchange of the nozzles or corresponding devices is approx. 20% of the total heating capacity without forcing an unwanted operation disruption.

3. A surplus of heating gas can hardly or not at all increase the heating capacity of the heating flame, but vice versa a surplus of heating oxygen or air can.

4. An adjustment or re-adjustment near the nozzle avoids distance or time related over or undersized control and allows smallest regulation steps.

5. The mass flow in a system is constant. Changes of the exit section result in pressure increases and pressure reductions with corresponding increases and reductions of flow velocities at the various passages at or in front of the nozzle, with that the friction losses in the incoming ducts and the impulse losses at the narrowing portions. That means, that with constant mass flow the velocity goes down if the pressure in the media goes up and the energy saving due to less friction loss enforces a higher exit velocity.

6. Having a sufficiently high input pressure, an exact mass flowing corresponding to the approximate volume requirements in the throughput passage can be adjusted, then only difficult to be influenced from the exit.

Basing in the area of deviations permitted in operation and in the range of adjustments more stringed stipulations and calculations in accordance with the standard rules of flow theories and gas dynamics are not necessary.

BRIEF DESCRIPTION OF THE DRAWINGS

The FIGURE shows a media control device in accordance with one preferred embodiment of the invention.

DESCRIPTION OF A PREFERRED EMBODIMENT

FIG. 1 is a sectional view of an embodiment of the mass flow control valve of this invention.

According to this invention the mass flow cock which is put onto the gas control unit according to European patent application 87 904 525.0 behind its pressure reducing part and before its selenoid valve consists of a body 1 with an inlet 2 and a lower cock chamber 3, which has a cock diaphragm 4 and is separated with a compensation bore 5 from the upper cock chamber 6. Above there is a seal diaphragm 7 to seal off the middle body 8.

In the cock bore 10 there is an in diameter and position adjustable cock piece 11, which is fixed onto the diaphragm bolt 13 with seal plate 12 and spring 14. The adjustment spindle 15 presses with a hand wheel 16 for exact adjustment equipped with an indication finger 17 and a scale 18. A valve passage 19 leads to a solenoid valve seat 20, from there a medium can flow via a characterizer 21 through the valve outlet 22 into the exit bore 23 and to the nozzle.

For example a procedure of a heating oxygen control resp. regulation for a cutting burner with a mass cock as per invention is as follows:

Out of a pressure reducer oxygen flows with high pressure for example 1000 KPA (=10 bar) via the inlet 2 into the lower cock chamber 3, from there through the compensation bore opening 5 of the cock diaphragm 4 into the upper cock chamber 6 and from there through the valve passage 19 against the closed solenoid valve in the solenoid valve seat 20. A pressure up to the inlet pressure for example 1000 KPA (=10 bar) is forming in the upper cock chamber 6 and the spring 14 presses the diaphragm bolt 13 and the seal plate 12 onto the cock seat 10. The system is closed. A required mass flow according to the required consumption volume is adjusted with the hand wheel 16 and the spindle 15 by opening the spring 14 between the spindle 15 and the diaphragm bolt 13 a little bit and indicated with the finger 17 and the scale 18. Here the mass flow can also be adjusted later when the medium is flowing.

At the beginning of the operation the solenoid valve in the solenoid valve seat 20 will be opened, via a valve outlet 22 and through a cock piece the 1000 KPA (=10 bar) heating oxygen flows out of the upper cock chamber 6, just that much quicker to be faster than the flow through the compensation bore 5 of the cock diaphragm 4. The predominantly constant pressure of the heating oxygen lifts the diaphragms 4 and 7, the diaphragm bolt 13 with the cock piece 11 as per adjusted measure; this results in a flow through the ring channel formed between cock bore 10 and cock piece 11 and through a part of the increasing window of the cylindric wall of the cock piece 11, according to a theoretical adjustment pressure of approx. −250 KPA (= −2,5 bar). The oxygen flows via the exit bore 23 to the user, for example a heating nozzle.

In case the flow of the medium out of the nozzle is reduced partly because of blocking, within the inlet to the nozzle a back pressure is formed, which could form a pressure according to a theoretical adjustment pressure of 270 KPA (−2,7 bar), depending on the intensity of the blocking. This results in a reduced flow speed and therefore reduced friction loss according to 5. of the above described physical conditions, and which results as well in reduced impulse losses at sudden passage change at the nozzle inlet, in course of the supply lines and in the mass flow cock. Therefore a higher medium pressure exists at the narrowed nozzle exit, which in certain ranges has no measurable effect because of the relative high pre-pressure in front of the mass flow cock and leads to a higher exit velocity through the narrowed nozzle and subsequently to approximately the same exit volume as before at the not yet narrowed nozzle. When the nozzle exit is reduced too much, it is possible with a sufficiently high pre-pressure that the exit velocity could become too high, which would transfer the flame, i.e. the place where the mixed gases, heating gas and heating oxygen are burning, too far away from the nozzle. This would increase the mixing with air, until the heating flame is blown out. With a too low pre-pressure a too high back pressure could become effective in the pre-pressure portion, for example in a pre-set pressure reducer, i.e. the above mentioned control unit, which results to the typical reaction of a pressure reducer, i.e. a reduction of the passage leading to lower pressure and subsequently to an increase of the effect of the narrowed nozzle, i.e. to a weaker volume availability.

Depending on the type of gas and pressure range the cock piece 11, maybe as well the characterizer 21 and the spring 14 have to be selected to reach an optimum effect of the mass flow cock. The simplest way to do this by empirical tests and evaluations until the results of the extensive calculations for all tubes and sections are available.

As a relatively high pre-pressure in front of a mass flow cock secures a good and safe volume equality at the exit i.e. at a nozzle in a sufficient wide range, it is possible to use the same medium with a higher working pressure. With a working pressure of 600-2000 KPA (6-20 bar) preferably at 1000-1200 KPA (10-12 bar) during oxy-cutting one part of the cutting oxygen can be used as heating oxygen if sufficient volume as supply for the mass flow cock is provided. The cost-and space-saving use of pressure reducers working from a higher supply pressure than the cutting oxygen working pressure eliminates a special pressure reducer for the heating oxygen. That means that an existing control unit with pressure reducer for cutting oxygen is equipped with a double outlet of which the second will be fitted with a mass flow cock for heating oxygen as well.

Of course one or more nozzles can be supplied safely and volume- constant via one mass flow cock. But as the influence of the heating capacity of a bigger gas volume is not important in comparison with heating oxygen, right from the start one can work with a heating gas surplus, which is reduced first to normal due to a narrowing bore in the nozzle or a flashback arrestor in front if it and thus does not need a re-adjustment of the volume flow via a pressure reducer even during operation spans. In addition nozzles using the injector principal produce section with the heating oxygen, of which the effect increases when lowering the heating gas flow.

The use of bigger sections and supply equipment also has advantages for a volume equality at the exit because then a change of the pressure results in a slow decreasing or increasing effect in a pressure reducer system. Like several users can be better supplied via ring piping or having several pressure reducers, corresponding pressure and volume changes due to switching on or switching off, this can be achieved even more effectively with even lower expenditure of funds by using a mass flow cock.

The elimination of piping and pressure reducers for heating oxygen does more than compensate for the additional cost of the mass flow cock. The advantages of fewer operational interruptions, break downs and maintenance requirements at longer maintenance intervals are more important. The smoother operating achieved in total in this area gives better production conditions of the over-all complicated plants.

Pressure measurement and recording with limit value signal of the back pressure in front of the nozzles is a good possibility for a constant survey of condition and timely resp. prophylactic maintenance, but helps as well to find the source of disturbance easily and quickly.

We claim:

1. An Oxy-cutting machine, comprising:
a cutting burner;
separate supply line for supplying heating gas, heating oxygen and cutting oxygen to said cutting burner;
a pressure reducer on said heating gas supply line;
a pressure reducer connected to said oxygen supply lines and having a first outlet connected to said cutting oxygen supply line and a second outlet connected to a heating oxygen mass flow control valve; and
said heating oxygen mass flow control valve includes a body having a gas inlet, a first chamber in communication with said gas inlet, a second chamber, a gas outlet in communication with said first chamber, and a valve passage connecting said second chamber and said gas outlet, a flexible diaphragm positioned between said first chamber and said second chamber and preventing unrestricted flow of gas between the two chambers, a compensation opening positioned in said diaphragm and permitting restricted flow of gas through the diaphragm between the two chambers, a cock opening connecting said first chamber and said outlet, a cock piece connected to an underside of said diaphragm and positioned to be received into said cock opening, spring means urging said cock piece into said cock opening, a first end of said spring means is in communication with an upper surface of said diaphragm, and adjustable spring stop means positioned above and in communication with a second end of said spring means opposite said end in communication with said diaphragm for adjustably positioning said second end of said spring means, whereby gas pressure differential between said first chamber and said second chamber will urge said diaphragm to move against the spring means and lift said cock piece out of said cock opening to allow gas to flow from said lower chamber to said gas outlet.

2. The Oxy-cutting machine of claim 1, wherein:
a cutting oxygen mass flow control valve is connected into said cutting oxygen supply line between said pressure reducer and said cutting burner and said cutting oxygen mass flow control valve is substantially identical to said heating oxygen mass flow control valve.

3. The Oxy-cutting machine of claim 1, wherein:
a heating gas mass flow control valve is connected into said heating gas supply line between said pressure reducer and said cutting burner and said heating gas mass flow control valve is substantially identical to said heating oxygen mass flow control valve.

4. The oxy-cutting machine of claim 1, wherein:
said mass flow control valve includes a solenoid shut-off valve for controlling gas flow through said valve passage.

5. The oxy-cutting machine of claim 1, wherein:
said adjustable spring stop means of said mass flow control valve includes a stop plate in communication with said spring means and a threaded rod extending generally upwardly from said stop plate through said body for raising and lowering said stop plate.

6. The oxy-cutting machine of claim 1, wherein:
indicator means are provided in association with said adjustable spring stop means of said mass flow control valve to indicate desired gas volume to flow into said outlet passages.

7. The oxy-cutting machine of claim 1, wherein:
said mass flow control valve includes an upper diaphragm positioned in said second chamber above said flexible diaphragm.

* * * * *

UNITED STATES PATENT AND TRADEMARK OFFICE
CERTIFICATE OF CORRECTION

PATENT NO. : 5,308,042
DATED : May 3, 1994
INVENTOR(S) : Horst K. Lotz, Glyndwr Manning, Mattias Lotz It is certified that error appears in the above-indentified patent and that said Letters Patent is hereby corrected as shown below:

Column 1, lines 31 and 32, "electronical" should be -- electronic --.

Signed and Sealed this

Twenty-first Day of March, 1995

Attest:

BRUCE LEHMAN

Attesting Officer      Commissioner of Patents and Trademarks